United States Patent
Tsutsui et al.

(10) Patent No.: US 9,564,780 B2
(45) Date of Patent: Feb. 7, 2017

(54) ROTARY ELECTRIC MACHINE AND ROTOR

(71) Applicant: KABUSHIKI KAISHA YASKAWA DENKI, Kitakyushu-shi (JP)

(72) Inventors: Yukio Tsutsui, Kitakyushu (JP); Atsushi Kawahara, Kitakyushu (JP); Motomichi Ohto, Kitakyushu (JP)

(73) Assignee: KABUSHIKI KAISHA YASKAWA DENKI, Kitakyushu-shi (JP)

(*) Notice: Subject to any disclaimer, the term of this patent is extended or adjusted under 35 U.S.C. 154(b) by 0 days.

(21) Appl. No.: 14/633,136

(22) Filed: Feb. 27, 2015

(65) Prior Publication Data
US 2015/0171678 A1   Jun. 18, 2015

Related U.S. Application Data

(63) Continuation of application No. PCT/JP2012/071889, filed on Aug. 29, 2012.

(51) Int. Cl.
*H02K 1/27* (2006.01)
*H02K 1/24* (2006.01)

(52) U.S. Cl.
CPC ............ *H02K 1/276* (2013.01); *H02K 1/2766* (2013.01); *H02K 1/246* (2013.01)

(58) Field of Classification Search
CPC ....... H02K 1/246; H02K 1/276; H02K 1/2766
USPC .......................... 310/156.56, 156.53, 156.57
See application file for complete search history.

(56) References Cited

U.S. PATENT DOCUMENTS

| | | | |
|---|---|---|---|
| 6,087,751 A | 7/2000 | Sakai | |
| 6,329,734 B1 * | 12/2001 | Takahashi | H02K 1/246 310/156.07 |
| 6,472,789 B1 * | 10/2002 | Akemakou | H02K 21/042 310/156.49 |
| 7,719,153 B2 * | 5/2010 | Hsu | H02K 21/046 310/156.53 |
| 8,179,011 B2 * | 5/2012 | Takemoto | H02K 1/276 310/156.53 |
| 8,598,763 B2 * | 12/2013 | Aota | H02K 1/276 310/156.53 |

(Continued)

FOREIGN PATENT DOCUMENTS

| | | |
|---|---|---|
| JP | 11-136912 | 5/1999 |
| JP | 2001-069735 | 3/2001 |

(Continued)

OTHER PUBLICATIONS

Japanese Office Action for corresponding JP Application No. 2014-532639, Sep. 8, 2015.

(Continued)

*Primary Examiner* — Alex W Mok
(74) *Attorney, Agent, or Firm* — Mori & Ward, LLP

(57) ABSTRACT

A rotary electric machine is provided, which includes a rotor core, a plurality of permanent magnets embedded in the rotor core, and a stator core arranged so as to oppose to the rotor core. The plurality of permanent magnets include a pair of first permanent magnets. The pair of first permanent magnets are arranged so that first magnetic poles thereof having the same polarity oppose to each other and are separated from each other on both sides of a magnetic path of d-axis by a predetermined distance. The rotor core includes gaps formed within the magnetic path of the d-axis.

25 Claims, 9 Drawing Sheets

(56) References Cited

U.S. PATENT DOCUMENTS

| | | | | |
|---|---|---|---|---|
| 2002/0047435 A1* | 4/2002 | Takahashi | ............... | H02K 1/246 |
| | | | | 310/156.56 |
| 2002/0171309 A1* | 11/2002 | Wakui | ................... | H02K 1/2766 |
| | | | | 310/156.48 |
| 2004/0095034 A1* | 5/2004 | Popov | ................... | H02K 1/2766 |
| | | | | 310/156.56 |
| 2007/0063607 A1* | 3/2007 | Hattori | ................. | H02K 1/2766 |
| | | | | 310/156.53 |
| 2007/0252470 A1* | 11/2007 | Lee | ......................... | H02K 1/276 |
| | | | | 310/216.049 |
| 2009/0045688 A1* | 2/2009 | Liang | ................... | H02K 1/2766 |
| | | | | 310/156.07 |

FOREIGN PATENT DOCUMENTS

| | | |
|---|---|---|
| JP | 2001-086673 | 3/2001 |
| JP | 2001-095182 | 4/2001 |
| JP | 2009-071918 | 4/2009 |

OTHER PUBLICATIONS

International Search Report for corresponding International Application No. PCT/JP2012/071889, Nov. 27, 2012.
Written Opinion for corresponding International Application No. PCT/JP2012/071889, Nov. 27, 2012.
International Preliminary Report on Patentability with Translation of Written Opinion of the International Searching Authority for corresponding International Application No. PCT/JP2012/071889, Mar. 3, 2015.

* cited by examiner

… (US 9,564,780 B2)

ROTARY ELECTRIC MACHINE AND ROTOR

CROSS-REFERENCE TO RELATED APPLICATION(S)

The present application is a continuation application of International Application No. PCT/JP2012/071889, filed Aug. 29, 2012, the entire content of which is hereby incorporated by reference.

TECHNICAL FIELD

The present disclosure relates to a rotary electric machine and a rotor.

BACKGROUND

Conventionally, rotary electric machines in which permanent magnets are embedded in a rotor core thereof are known. For example, JP2001-069735A discloses such a rotary electric machine.

JP2001-069735A discloses the rotary electric machine including a rotor core, a plurality of permanent magnets embedded in the rotor core, and a stator core arranged so as to oppose to the rotor core. In such a rotary electric machine, the plurality of permanent magnets are arranged so that a magnet magnetic field axis and d-axis electrically intersect perpendicular to each other, and generate torque which is mainly comprised of a reluctance torque component by canceling a armature magnetic flux of q-axis by the magnet magnetic flux to increase a difference between the armature magnetic flux of the q-axis and the d-axis.

SUMMARY

According to one aspect of the present disclosure, a rotary electric machine is provided, which includes a rotor core, a plurality of permanent magnets embedded in the rotor core, and a stator core arranged so as to oppose to the rotor core. The plurality of permanent magnets include a pair of first permanent magnets. The pair of first permanent magnets are arranged so that first magnetic poles thereof having the same polarity oppose to each other and are separated from each other on both sides of a magnetic path of d-axis by a predetermined distance. The rotor core includes gaps formed within the magnetic path of the d-axis.

According to another aspect of the present disclosure, a rotor is provided, which includes a rotor core, and a plurality of permanent magnets embedded in the rotor core. The plurality of permanent magnets are arranged so that magnet magnetic field axis and d-axis are oriented mutually in the same direction. The rotor core includes gaps formed within a magnetic path of the d-axis.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, several embodiments are described with reference to the accompanying drawings.

First Embodiment

Figure 1:
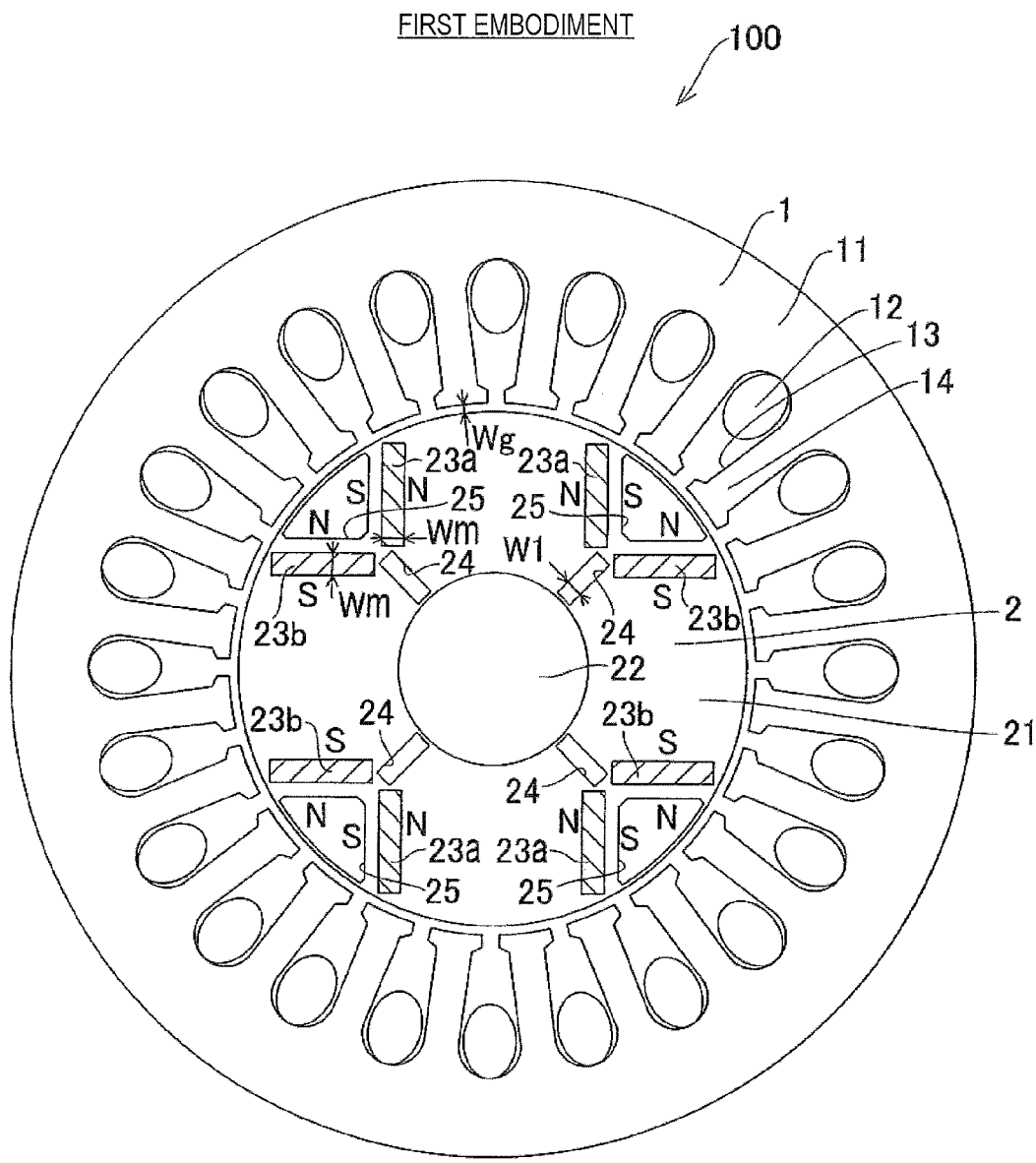
FIG. 1 is a plan view of a rotary electric machine according to a first embodiment.
Figure 2:
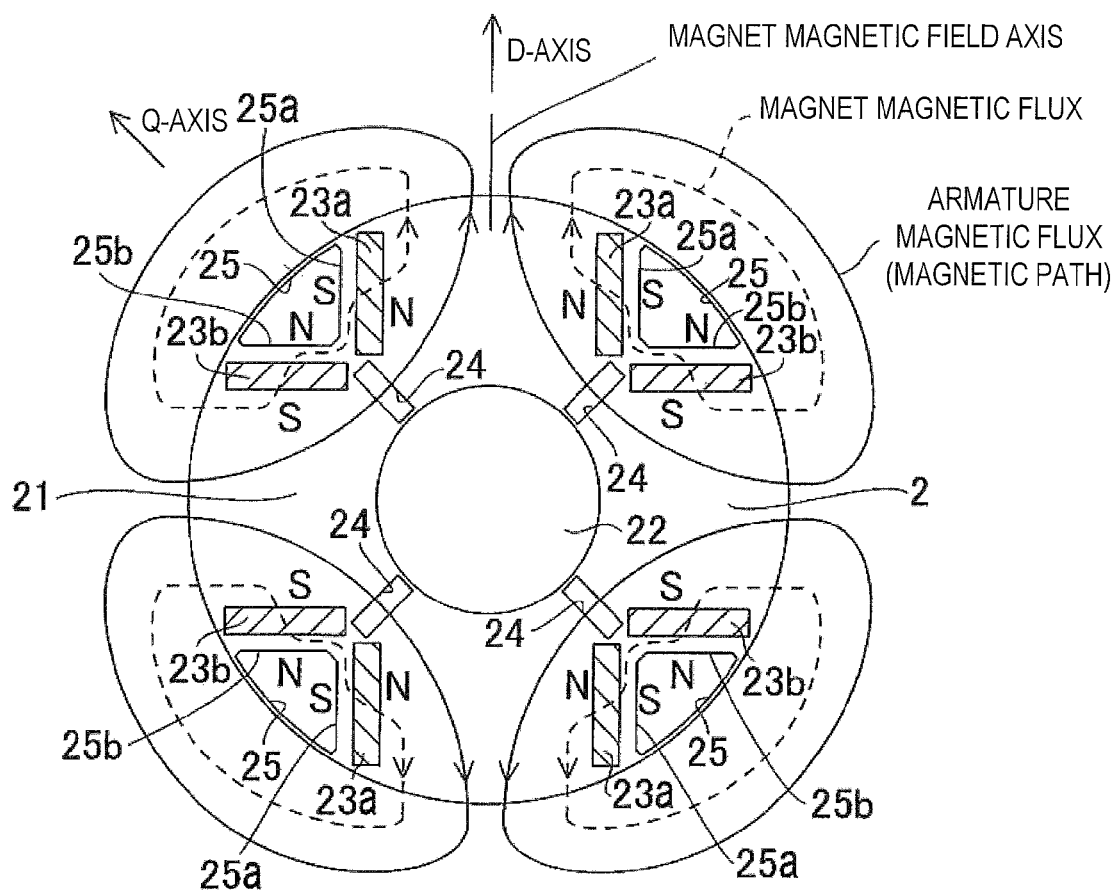
FIG. 2 is a plan view illustrating a magnetic flux which passes through a rotor of the rotary electric machine according to the first embodiment.

With reference to FIGS. 1 and 2, a configuration of a rotary electric machine 100 according to a first embodiment is described.

As illustrated in FIG. 1, the rotary electric machine 100 includes a stator 1 which is a stationary part, and a rotor 2 which is a rotary part. The stator 1 includes a stator core 11 and windings 12. The stator core 11 is formed in a circular cylindrical shape. A plurality of slots 13 are formed in the stator core 11. Part of the stator core 11 between one slot 13 and an adjacent slot 13 constitutes a tooth section 14. The winding 12 is wound between the slots 13. Note that the winding 12 is wound by a concentrated winding or distributed winding manner.

The rotor 2 includes a rotor core 21, a shaft 22, and a plurality of permanent magnets 23a and a plurality of permanent magnets 23b. The rotor core 21 has a plurality of slits 24 and a plurality of flux barriers 25. The rotor core 21 is arranged so that an outer circumferential surface thereof opposes to an inner circumferential surface of the stator core 11. The rotor core 21 is formed, for example, by laminating electromagnetic steel sheets. Note that the rotor core 21 may be, for example, formed by circularly bending a ferromagnetic member made of iron, or constructed from a ferromagnetic member of a circular cylindrical shape. Further, the ferromagnetic member of the circular cylindrical shape may be formed, for example, by casting. Note that the permanent magnet 23a is one example of the "first permanent magnet" in the claims, and the permanent magnet 23b is one example of the "second permanent magnet" in the claims. Further, the slit 24 is one example of the "gap" in the claims.

The shaft 22 is provided so as to penetrate though the rotor core 21 at the center. This shaft 22 is constructed so as to rotatably support the rotor core 21. Further, the shaft 22 is made of nonmagnetic material (e.g., nonmagnetic stainless steel).

The permanent magnets 23a and 23b are embedded in the rotor core 21. In this embodiment, two pairs of permanent magnets 23a (or 23b) are provided (total of four magnets), and each pair is oppositely arranged to each other. As illustrated in FIG. 2, each pair of permanent magnets 23a are arranged so that N-poles thereof oppose to each other on both sides of the magnetic path of the d-axis and are separated from each other by a predetermined distance. Each pair of permanent magnets 23b are arranged so that S-poles thereof oppose to each other on both sides of the magnetic path of the d-axis and are separated from each other by the predetermined distance. That is, the permanent magnets 23a are arranged so that the N-poles thereof are oriented toward the magnetic path of the d-axis, and the permanent magnets 23b are arranged so that the S-poles thereof are oriented toward the magnetic path of the d-axis. Further, the plurality of the permanent magnets 23a and 23b are arranged so that the d-axis of the armature (d-axis as the reluctance motor) and the magnet magnetic field axis are mutually oriented in the same direction. Further, each opposing pair of permanent magnets 23a (or 23b) are arranged so as to extend in parallel to each other along the d-axis. Further, each permanent magnet 23b is disposed adjacently to the corresponding permanent magnet 23a. That is, each permanent magnet 23b is adjacently arranged to the corresponding permanent magnet 23a so as to extend in a direction substantially perpendicular to the permanent magnet 23a.

As illustrated in FIG. 2, the permanent magnets 23a and 23b which are adjacent to each other on both sides of the q-axis are arranged so as to oppose to each other at mutually different magnetic poles and to surround the corresponding flux barrier 25 of a substantially sector or fan shape (along straight sections 25a and 25b of the flux barrier 25). Particularly, the permanent magnet 23a is arranged so that the S-pole thereof faces toward the flux barrier 25, while the permanent magnet 23b is arranged so that the N-pole thereof faces toward the flux barrier 25. That is, the permanent magnets 23a and 23b which are located adjacent to each other on both sides of the q-axis are arranged in a substantially V-shape so that their mutually different magnetic poles face to the flux barrier 25. Further, the permanent magnets 23a and 23b are formed to have a width Wm (see FIG. 1), respectively. Further, the permanent magnets 23a and 23b are comprised of, for example, permanent magnets made of ferrite.

In the first embodiment, each slit 24 is constructed to prevent or reduce that the magnet magnetic flux of the permanent magnets 23a and 23b which are located adjacent to the slit 24 magnetically short-circuit (i.e., the N-pole of the permanent magnet 23a and the S-pole of the permanent magnet 23b magnetically short-circuit inside the rotor core 21). Particularly, each slit 24 is constructed by the slit-shaped space (gap) extending in a direction intersecting with the direction of the magnet magnetic flux which short-circuits the permanent magnets 23a and 23b located adjacent to the slit 24. The slits 24 are formed within the magnetic path of the d-axis. That is, as illustrated in FIG. 2, the slits 24 are formed so as to extend in directions which intersect with (perpendicular to) the direction of the armature magnetic flux (d-axis). Each slit 24 is formed within the magnetic path of the d-axis near the boundary between the N-pole of the permanent magnet 23a and the S-pole of the permanent magnet 23b which are located adjacent to the slit 24.

Further, each slit 24 is disposed at a position to prevent or reduce that the N-pole of the permanent magnet 23a and the S-pole of the permanent magnet 23b, which are located adjacent to the slit 24 on both sides of the q-axis, short-circuit by passing through the inside of the rotor core 21. Particularly, each slit 24 is formed so as to extend in a direction which intersects with the extending directions of the permanent magnet 23a and the permanent magnet 23b, within the magnetic path of the d-axis near the boundary between the N-pole of the permanent magnet 23a and the S-pole of the permanent magnet 23b which are adjacent to the slit 24. In more detail, the slits 24 are formed to linearly extend along the radial directions of the rotor core 21 so that the magnet magnetic flux which short-circuits in a direction which intersects with the radial direction of the rotor core 21 is intercepted. That is, each slit 24 is formed so as to linearly extend to near the shaft 22 in an inward radial direction of the rotor core 21 from near the boundary between the permanent magnet 23a and the permanent magnet 23b which are located adjacent to the slit 24. Further, the slit 24 is formed so as to extend along the q-axis direction of the magnet magnetic flux and the armature magnetic flux.

As illustrated in FIG. 1, each slit 24 is formed to have a width W1 larger than a gap Wg between the rotor core 21 and the stator core 11. Particularly, the slit 24 is formed to have the width W1 which is twice larger than the gap Wg between the rotor core 21 and the stator core 11. Further, the slit 24 is formed to have the width W1 smaller than the widths Wm of the permanent magnets 23a and 23b. Thus, each slit 24 is constructed so as to prevent the passing of the short-circuiting magnet magnetic flux of the permanent magnets 23a and 23b which are located adjacent to the slit 24. Further, each slit 24 is constructed so as to prevent the passing of the armature magnetic flux through the permanent magnets 23a and 23b which are located adjacent to the slit 24.

The flux barriers 25 are formed near the outer circumferential part of the rotor core 21. Each flux barrier 25 is formed on the opposite side from the slit 24 with respect to the permanent magnets 23a and 23b which are located adjacent to the flux barrier 25. The flux barriers 25 are formed in order to give magnetic saliency (axis through which the magnetic field is easy to pass and axis through which the magnetic field is difficult to pass) to the rotor core 21. Each flux barrier 25 is formed so as to be separated from the corresponding slit 24 by a predetermined distance in a radial direction of the rotor core 21. Thus, as illustrated in FIG. 2, the magnet magnetic flux of the N-pole of the permanent magnet 23b and the S-pole of the permanent magnet 23a is short-circuited by passing between the corresponding slit 24 and flux barrier 25. Further, each flux barrier 25 is constructed by a space having a substantially sector or fan shape in a plan view. Each flux barrier 25 is formed in the q-axis direction (on the q-axis) of the magnet magnetic flux and the armature magnetic flux.

Figure 3:
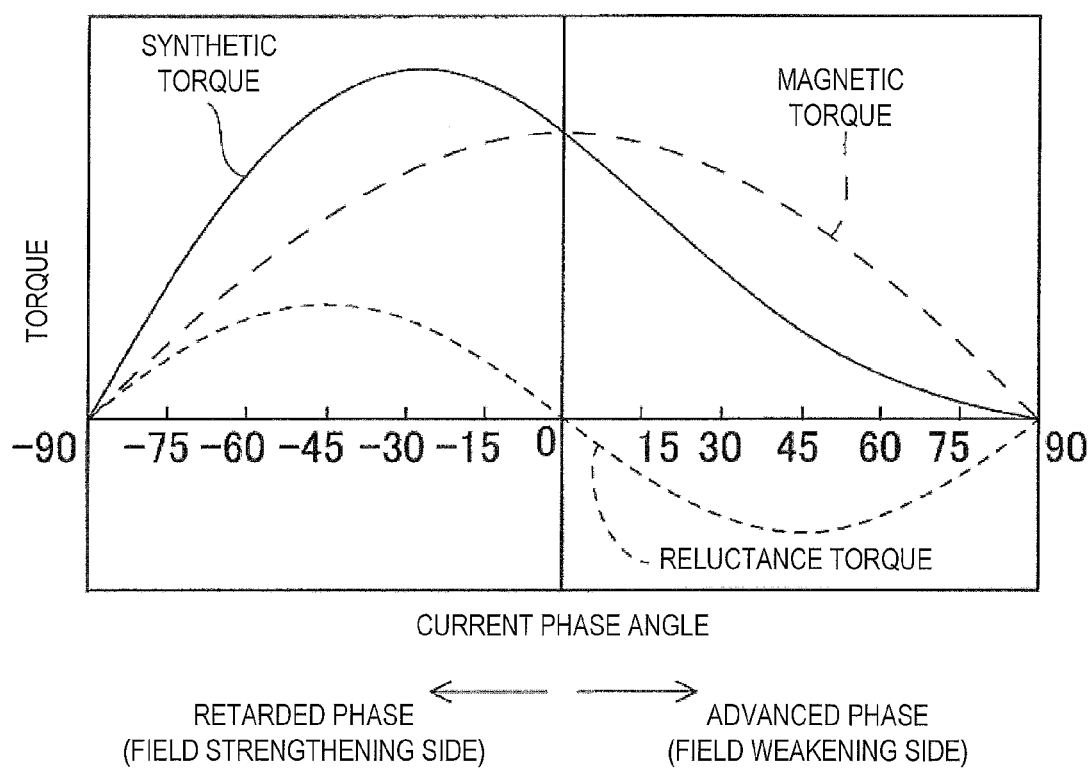
FIG. 3 is a graph illustrating a relation between a current phase angle and a torque of the rotary electric machine according to the first embodiment.
Figure 4:
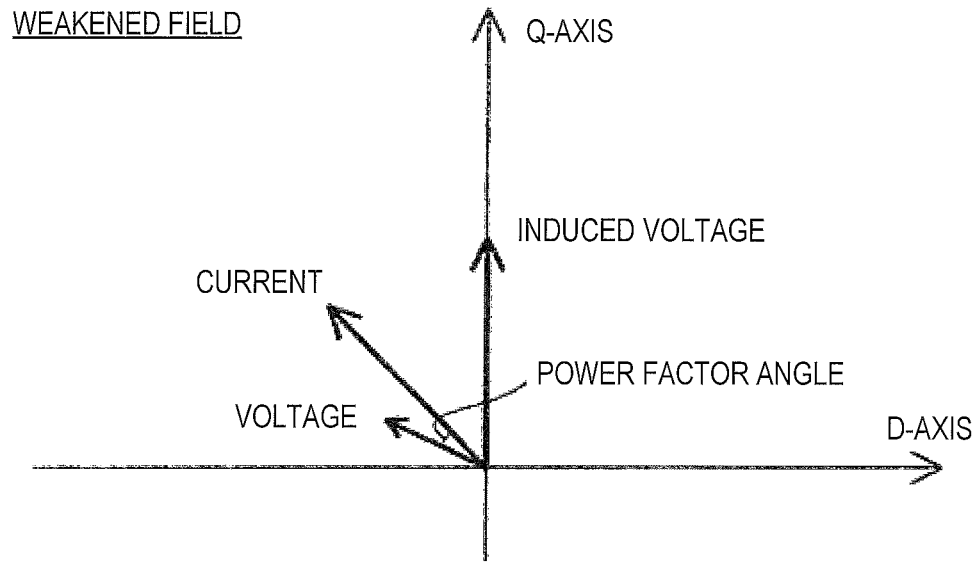
FIG. 4 is a vector diagram at the time of performing a field weakening control of the rotary electric machine according to the first embodiment.
Figure 5:
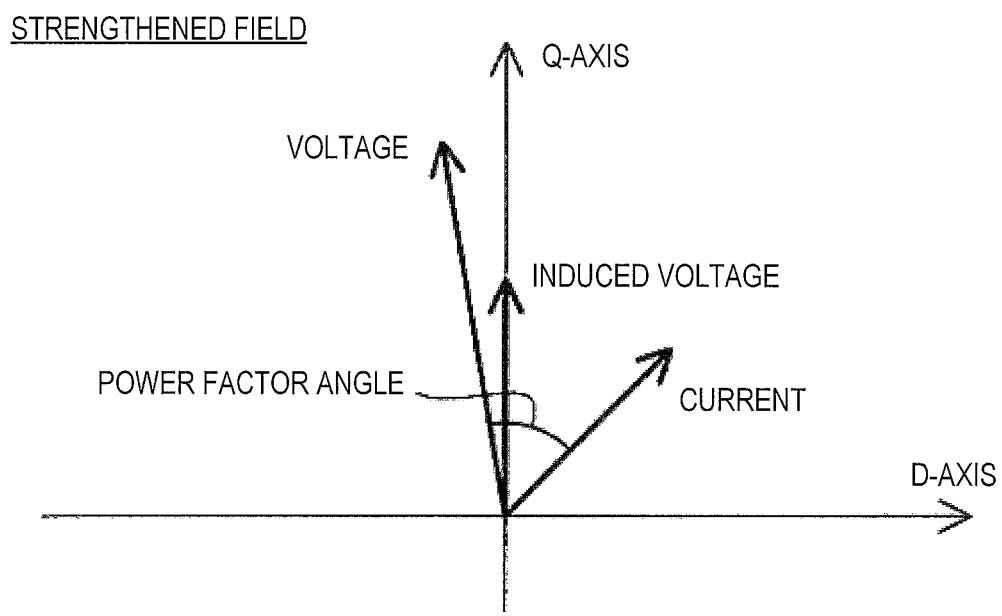
FIG. 5 is a vector diagram at the time of performing a field strengthening control of the rotary electric machine according to the first embodiment.

Next, with reference to FIGS. 3 to 5, the field strengthening control and the field weakening control of the rotary electric machine 100 according to the first embodiment are described.

The rotary electric machine 100 according to the first embodiment has characteristics of torque with respect to a current phase angle, as illustrated in FIG. 3. That is, in this rotary electric machine 100, the reluctance torque generated by the armature magnetic flux increases in a case where the current phase angle is retarded in phase (negative phase), and the reluctance torque decreases in a case where the current phase angle is advanced in phase (positive phase). Therefore, it is possible to increase the synthetic torque by performing the field strengthening control which retards the current phase angle before the voltage is saturated. In this case, as illustrated in FIG. 5, since the torque becomes large although a power factor angle becomes large, it is possible to obtain a desired output as a result. Further, it is possible to reduce lowering of the output resulting from the saturation of the voltage, by advancing the current phase angle to perform the field weakening control when the voltage is saturated. That is, as illustrated in FIG. 4, the output drop is reduced by advancing the current phase angle and reducing the power factor angle of the current and the voltage. Thus, since both the field strengthening control and the field weakening control can be performed, it is possible to widen the adjustable speed range, and it is possible to obtain the rotary electric machine 100 with characteristics suitable for being mounted to an automobile.

Since, in the first embodiment, the magnet magnetic field axis and the d-axis are mutually oriented in the same direction by providing the pair of permanent magnets 23a which are located on both sides of the magnetic path of the d-axis and are separated from each other by the predetermined distance so that the same magnetic poles of the permanent magnets 23a oppose to each other as described above, the torque by the magnet magnetic flux and the reluctance torque by the armature magnetic flux can be generated without mutually canceling the torques. Thus, the torque of the rotary electric machine 100 can further be increased. Further, since the short-circuit of the magnet magnetic flux via the magnetic path of the d-axis is prevented or reduced by the slits 24 which are formed in the rotor core 21 and within the magnetic path of the d-axis, the torque by the magnet magnetic flux can efficiently be generated.

Further, in the first embodiment, as described above, the permanent magnets 23b are arranged so that they are located adjacent to the permanent magnets 23a, respectively, and the S-poles of the permanent magnets 23b are oriented toward the magnetic path of the d-axis, and each slit 24 is formed within the magnetic path of the d-axis near the boundary between the N-pole of the permanent magnet 23a and the S-pole of the permanent magnet 23b which are located adjacent to the slit 24. Thus, it can be easily prevented or reduced that the N-pole of the permanent magnet 23a and the S-pole of the permanent magnet 23b which are adjacent to each other short-circuit on the magnetic path side of the d-axis.

Further, in the first embodiment, as described above, each slit 24 is formed so as to extend in the direction which intersects with (perpendicular to) the d-axis, within the magnetic path of the d-axis near the boundary between the N-pole of the permanent magnet 23a and the S-pole of the permanent magnet 23b which are located adjacent to the slit 24. Thus, since the distance of the armature magnetic flux passing through the slit 24 is shortened, compared with the case where the slit 24 is formed so as to extend in the d-axis direction, the short-circuit of the magnet magnetic flux via the magnetic path of the d-axis can be prevented or reduced, while the armature magnetic flux can easily pass therethrough.

Further, in the first embodiment, each slit 24 has the width W1 larger than the gap Wg between the rotor core 21 and the stator core 11, as described above. Thus, since the magnet magnetic flux of the permanent magnets 23a and 23b becomes easier to pass through the gap between the rotor core 21 and the stator core 11 than the slit 24, it can be easily prevented or reduced that the magnet magnetic flux of the permanent magnets 23a and 23b magnetically short-circuits.

Further, in the first embodiment, each slit 24 has the width W1 which is twice larger than the gap Wg between the rotor core 21 and the stator core 11, as described above. Thus, the magnet magnetic flux of the permanent magnets 23a and 23b which passes twice (i.e., round-trips the gap) through the gap between the rotor core 21 and the stator core 11 is made easier to pass through the gap between the rotor core 21 and the stator core 11 rather than the slit 24.

Further, in the first embodiment, as described above, each slit 24 has the width W1 smaller than the width Wm of the permanent magnets 23a and 23b. Thus, since the armature magnetic flux passes through the slits 24 without passing through the permanent magnets 23a and 23b, it can reduce that the magnet magnetic flux is weakened by the armature magnetic flux when performing the field weakening control unlike the case where the armature magnetic flux passes through the permanent magnets 23a and 23b.

Further, in the first embodiment, as described above, the permanent magnets 23a and 23b are arranged so as to extend along the d-axis, respectively, and each slit 24 is formed so as to extend in the direction which intersects with the extending directions of the permanent magnets 23a and 23b, within the magnetic path of the d-axis near the boundary between the N-pole of the permanent magnet 23a and the S-pole of the permanent magnet 23b which are located adjacent to the slit 24. Thus, the slit 24 extending in the direction which intersects with the extending directions of the permanent magnets 23a and 23b can effectively prevent or reduce that the magnet magnetic flux short-circuits via the magnetic path of the d-axis.

Further, in the first embodiment, as described above, the pair of permanent magnets 23a are arranged so as to extend in parallel to each other along the d-axis and so as to oppose to each other, while each of the permanent magnets 23b is arranged so as to extend in the direction substantially perpendicular to the corresponding permanent magnet 23a. Further, each slit 24 is formed so as to linearly extend inwardly in the radial direction of the rotor core 21 from near the boundary between the permanent magnets 23a and 23b which are located adjacent to the slit 24. Thus, the slit 24 extending linearly in the radial direction of the rotor core 21 can effectively prevent or reduce that the magnet magnetic flux of the permanent magnets 23a and 23b short-circuits.

Further, in the first embodiment, as described above, the shaft 22 made of the nonmagnetic material which rotatably supports the rotor core 21 is provided, and each slit 24 is formed so as to linearly extend to near the shaft 22 inwardly in the radial direction of the rotor core 21 from near the boundary between the permanent magnets 23a and 23b which are located adjacent to the slit 24. Thus, both the shaft 22 made of the nonmagnetic material and the slits 24 can more effectively prevent or reduce that the magnet magnetic flux of the permanent magnets 23a and 23b short-circuits.

Further, in the first embodiment, as described above, the permanent magnets 23a and 23b are constructed by permanent magnets made of ferrite. Thus, since it is effectively utilize the reluctance torque by the armature magnetic flux also when using the magnets made of ferrite which are magnetically weaker than rare-earth magnets, a desired output can easily be obtained.

Further, in the first embodiment, as described above, each flux barrier 25 is provided near the outer circumferential part of the rotor core 21 and on the opposite side of the permanent magnets 23a and 23b from the slit 24, and the permanent magnets 23a and 23b are arranged so as to surround the flux barrier 25. Thus, the magnetic saliency can be given to the rotor core 21 by the flux barrier 25, and the magnet magnetic flux can be strengthened by the plurality of the permanent magnets 23a and 23b which surround the flux barrier 25.

Second Embodiment

Figure 6:
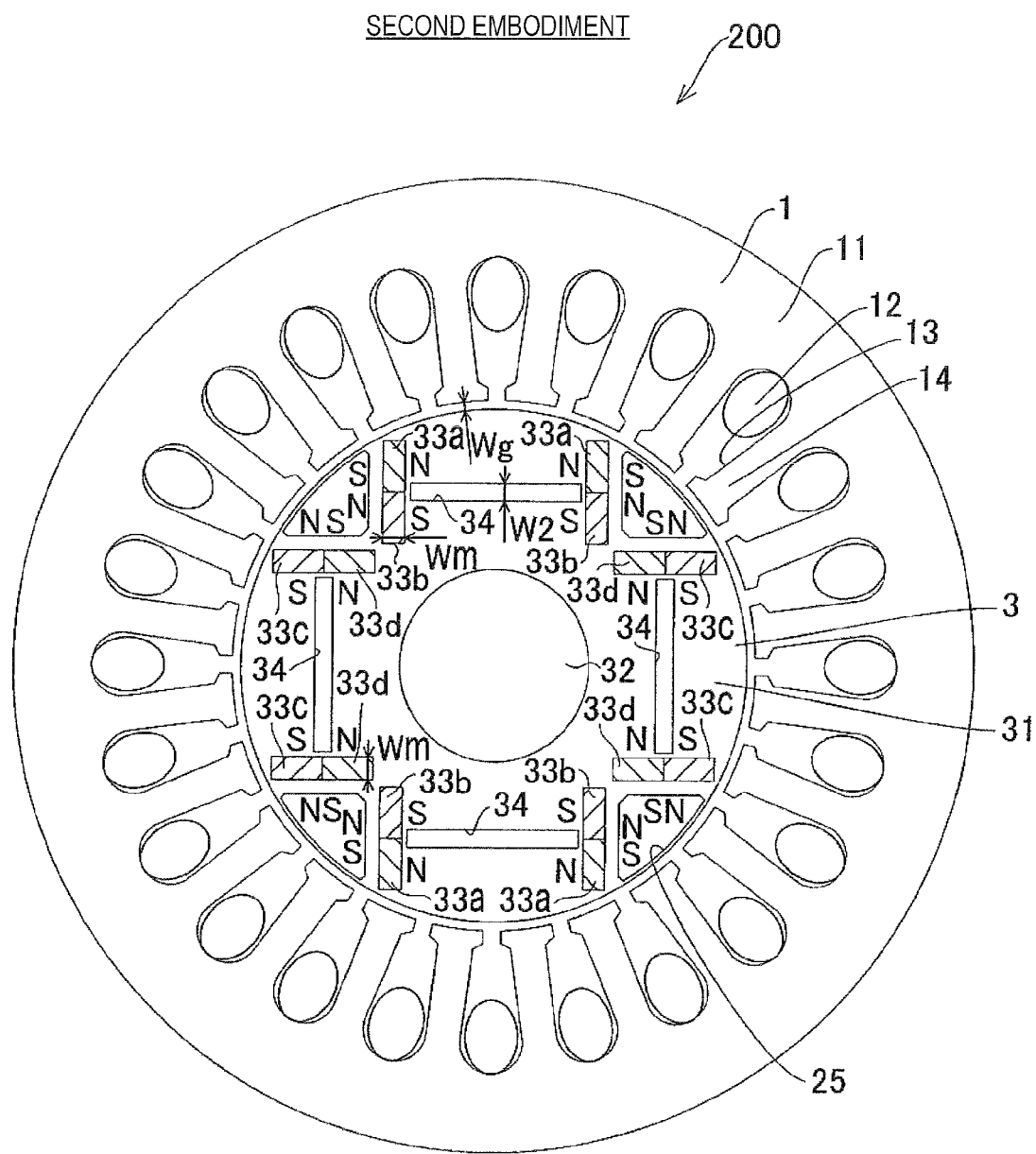
FIG. 6 is a plan view of a rotary electric machine according to a second embodiment.
Figure 7:
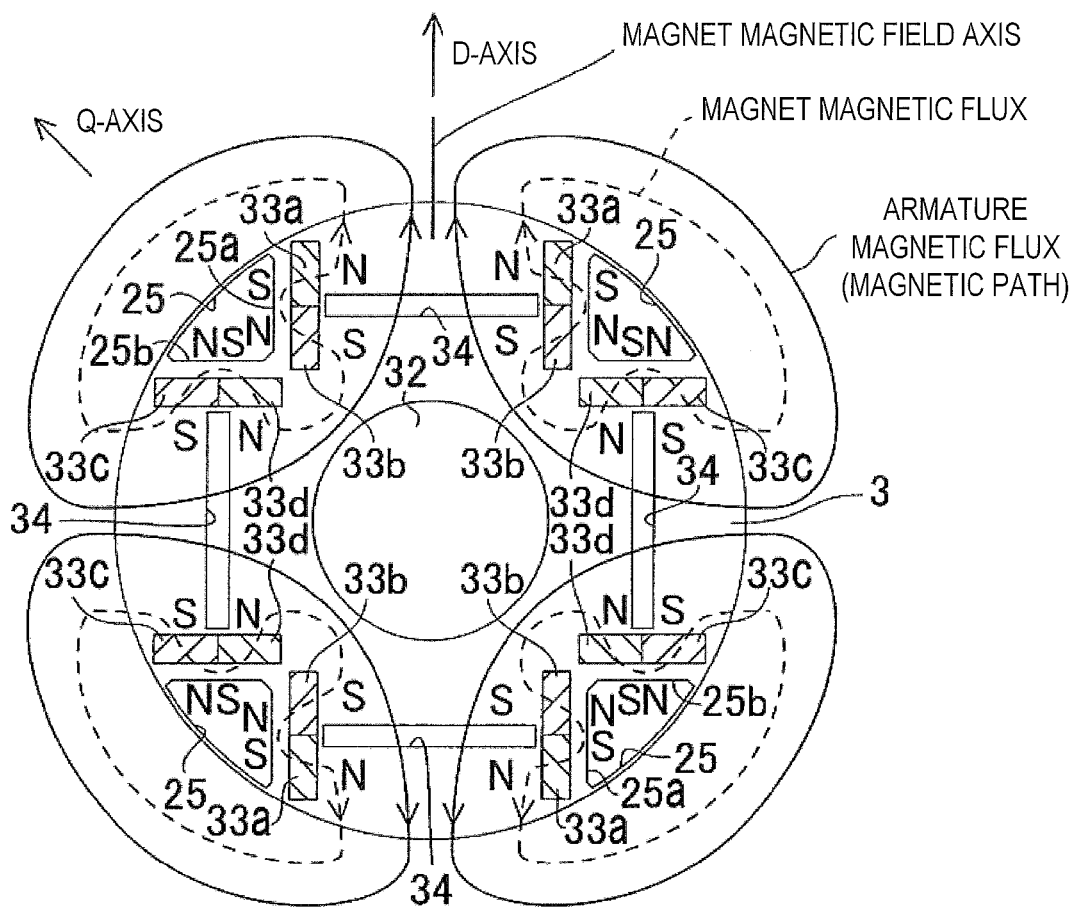
FIG. 7 is a plan view illustrating a magnetic flux which passes through a rotor of the rotary electric machine according to the second embodiment.

Next, with reference to FIGS. 6 and 7, a configuration of a rotary electric machine 200 according to a second embodiment is described. In the second embodiment, an example in which slits are formed so as to extend in directions which intersect perpendicularly to the radial directions of the rotor core is described, unlike the above first embodiment in which the slits are formed so as to extend in the radial directions of the rotor core. Note that descriptions of configurations of the second embodiment which are similar to those of the above first embodiment are omitted while using the same reference numerals.

As illustrated in FIG. 6, a rotor 3 according to the second embodiment includes a rotor core 31, a shaft 32, and permanent magnets 33*a*, 33*b*, 33*c* and 33*d*. The rotor core 31 includes slits 34 and flux barriers 25. The rotor core 31 is arranged so as to oppose to the inside of the stator core 11. The rotor core 31 is formed, for example, by laminating electromagnetic steel sheets. Note that the rotor core 31 may be, for example, formed by circularly bending a ferromagnetic member made of iron, or constructed from a ferromagnetic member of a circular cylindrical shape. Further, the ferromagnetic member of the circular cylindrical shape may be formed, for example, by casting. Note that the permanent magnets 33*a* and 33*c* are examples of the "first permanent magnet" in the claims, and the permanent magnets 33*b* and 33*d* are examples of the "second permanent magnet" in the claims. Further, the slit 34 is one example of the "gap" in the claims.

The shaft 32 is provided so as to penetrate through the rotor core 31 at the center. This shaft 32 is constructed so as to rotatably support the rotor core 31. Further, the shaft 32 is made of magnetic material (e.g., magnetic stainless steel). In the second embodiment, since it does not matter if the magnet magnetic flux of the permanent magnets 33*a* and 33*b* (33*c* and 33*d*) magnetically short-circuits at the radially inward part of the rotor core 31, it is not disadvantageous that the shaft 32 is made of magnetic material.

The permanent magnets 33*a*-33*d* are embedded in the rotor core 31. In this embodiment, two pairs of permanent magnets 33*a* (or permanent magnets 33*b*-33*d*, respectively) are provided (total of four magnets), and each pair is oppositely arranged to each other. As illustrated in FIG. 7, each pair of permanent magnets 33*a* are arranged so that N-poles thereof oppose to each other on both sides of the magnetic path of the d-axis and are separated from each other by a predetermined distance. Each pair of permanent magnets 33*b* are arranged so that S-poles thereof oppose to each other on both sides of the magnetic path of the d-axis and are separated from each other by the predetermined distance. That is, the permanent magnets 33*a* are arranged so that the N-poles are oriented toward the magnetic path of the d-axis, and the permanent magnets 33*b* are arranged so that the S-poles are oriented toward the magnetic path of the d-axis. Further, each permanent magnet 33*b* is arranged so as to linearly adjacent in the d-axis direction to the corresponding permanent magnet 33*a*. Each pair of permanent magnets 33*c* are arranged so that the S-poles thereof oppose to each other on both sides of the magnetic path of the d-axis and are separated from each other by the predetermined distance. Each pair of permanent magnets 33*d* are arranged so that the N-poles thereof oppose to each other on both sides of the magnetic path of the d-axis and are separated from each other by the predetermined distance. That is, the permanent magnets 33*c* are arranged so that the S-poles are oriented toward the magnetic path of the d-axis, and the permanent magnets 33*d* are arranged so that the N-poles are oriented toward the magnetic path of the d-axis. Further, each permanent magnet 33*d* is arranged so as to be linearly adjacent in the d-axis direction to the corresponding permanent magnet 33*c*. Further, the permanent magnets 33*a* and 33*b* are arranged so as to extend in a direction substantially perpendicular to the permanent magnets 33*c* and 33*d* which are located adjacent to the permanent magnets 33*a* and 33*b*.

Further, the permanent magnets 33*a*-33*d* are arranged so that the d-axis of the armature (d-axis as the reluctance motor) and the magnet magnetic field axis are mutually oriented in the same direction. Further, each opposing pair of permanent magnets 33*a* (33*b*-33*d*) are arranged so as to extend in parallel to each other along the d-axis. Further, the adjacent permanent magnets 33*a*-33*d* are arranged so that their magnetic poles are alternately located and they surround the substantially sector-shaped or fan-shaped flux barrier 25 (along the straight sections 25*a* and 25*b* of the flux barrier 25). Particularly, the permanent magnet 33*a* is arranged so that the S-pole thereof faces toward the flux barrier 25. The permanent magnet 33*b* is arranged so that the N-pole thereof faces toward the flux barrier 25. The permanent magnet 33*c* is arranged so that the N-pole thereof faces toward the flux barrier 25. The permanent magnet 33*d* is arranged so that the S-pole thereof faces toward the flux barrier 25. Further, the permanent magnets 33*a*-33*d* which are located adjacent to each other and surround the flux barrier 25 are arranged in a substantially V-shape. Further, the permanent magnets 33*a*-33*d* are formed to have the width Wm (see FIG. 6), respectively. Further, the permanent magnets 33*a*-33*d* are comprised of, for example, permanent magnets made of ferrite.

In the second embodiment, each slit 34 is constructed to prevent or reduce that the magnet magnetic flux of the permanent magnets 33*a* and 33*b* (33*c* and 33*d*) which are located adjacent to the slit 34 magnetically short-circuits. Particularly, each slit 34 is constructed by a slit-shaped space (gap) extending in a direction intersecting with the direction of the magnet magnetic flux which short-circuits the permanent magnets 33*a* and 33*b* (33*c* and 33*d*) located adjacent to the slit 34. Each slit 34 is formed within the magnetic path of the d-axis. That is, as illustrated in FIG. 7, each slit 34 is formed so as to extend in a direction substantially perpendicular to the direction of the armature magnetic flux (d-axis). Each slit 34 is formed within the magnetic path of the d-axis near a boundary between the N-pole of the permanent magnet 33*a* (S-pole of the permanent magnet 33*c*) and the S-pole of the permanent magnet 33*b* (N-pole of the permanent magnet 33*d*) which are located adjacent to the slit 34.

Further, each slit 34 is disposed at a position to prevent or reduce the short-circuit of the N-pole of the permanent magnet 33*a* (S-pole of the permanent magnet 33*c*) and the S-pole of the permanent magnet 33*b* (N-pole of the permanent magnet 33*d*) which are located adjacent to the slit 34 in the d-axis direction. Particularly, one pair of slits 34 are formed so as to linearly extend from near the boundary between the N-pole of one of the permanent magnets 33*a* and the S-pole of one of the permanent magnets 33*b* to near the boundary between the N-pole of the other permanent magnet 33*a* and the S-pole of the other permanent magnet 33*b* which are arranged so as to oppose to each other on both sides of the magnetic path of the d-axis. Further, the other pair of slits 34 are formed so as to linearly extend from near the boundary between the S-pole of one of the permanent magnets 33*c* and the N-pole of one of the permanent magnets 33*d* to near the boundary between the S-pole of the other permanent magnet 33c and the N-pole of the other permanent magnets 33d which are arranged so as to oppose to each other on both sides of the magnetic path of the d-axis. Further, the slits 34 are formed so as to extend in directions substantially perpendicular to the radial directions of the rotor core 31.

As illustrated in FIG. 6, each slit 34 is formed to have a width W2 larger than the gap Wg between the rotor core 31 and the stator core 11. Particularly, the slit 34 is formed to have the width W2 which is twice larger than the gap Wg between the rotor core 31 and the stator core 11. Further, the slit 34 is formed to have the width W2 smaller than the width Wm of the permanent magnets 33a-33d. Thus, one pair of slits 34 are constructed so as to prevent the short-circuiting of the magnet magnetic flux through the permanent magnets 33a-33d. Further, the other pair of slits 34 are constructed so as to prevent the passing of the armature magnetic flux through the permanent magnets 33a-33d.

Other configurations of the second embodiment are similar to those of the above first embodiment.

In the second embodiment, as described above, the slit 34 is formed so as to linearly extend from near the boundary between the N-pole of one of the permanent magnets 33a (S-pole of one of the permanent magnets 33c) and the S-pole of one of the permanent magnets 33b (N-pole of one of the permanent magnets 33d) to near the boundary between the N-pole of the other permanent magnet 33a (S-pole of the other permanent magnet 33c) and the S-pole of the other permanent magnet 33b (N-pole of the other permanent magnet 33d) which are arranged so as to oppose to each other on both sides of the magnetic path of the d-axis. Thus, the slit 34 can effectively prevent or reduce that the magnet magnetic flux of the permanent magnets 33a and 33b (33c and 33d) short-circuits.

In the second embodiment, as described above, the slit 34 is formed so as to extend in the direction substantially perpendicular to the d-axis. Thus, the slit 34 extending in the direction substantially perpendicular to the d-axis can easily prevent or reduce that the magnet magnetic flux short-circuits via the magnetic path of the d-axis.

Further, in the second embodiment, as described above, the slits 34 are formed so as to extend in the directions substantially perpendicular to the radial directions of the rotor core 31. Thus, the slit 34 extending in the direction which intersects perpendicular to the radial direction of the rotor core 31 can effectively prevent or reduce that the magnet magnetic flux of the permanent magnets 33a and 33b (33c and 33d) short-circuits.

Other effects of the second embodiment are similar to those of the above first embodiment.

Third Embodiment

Figure 8:
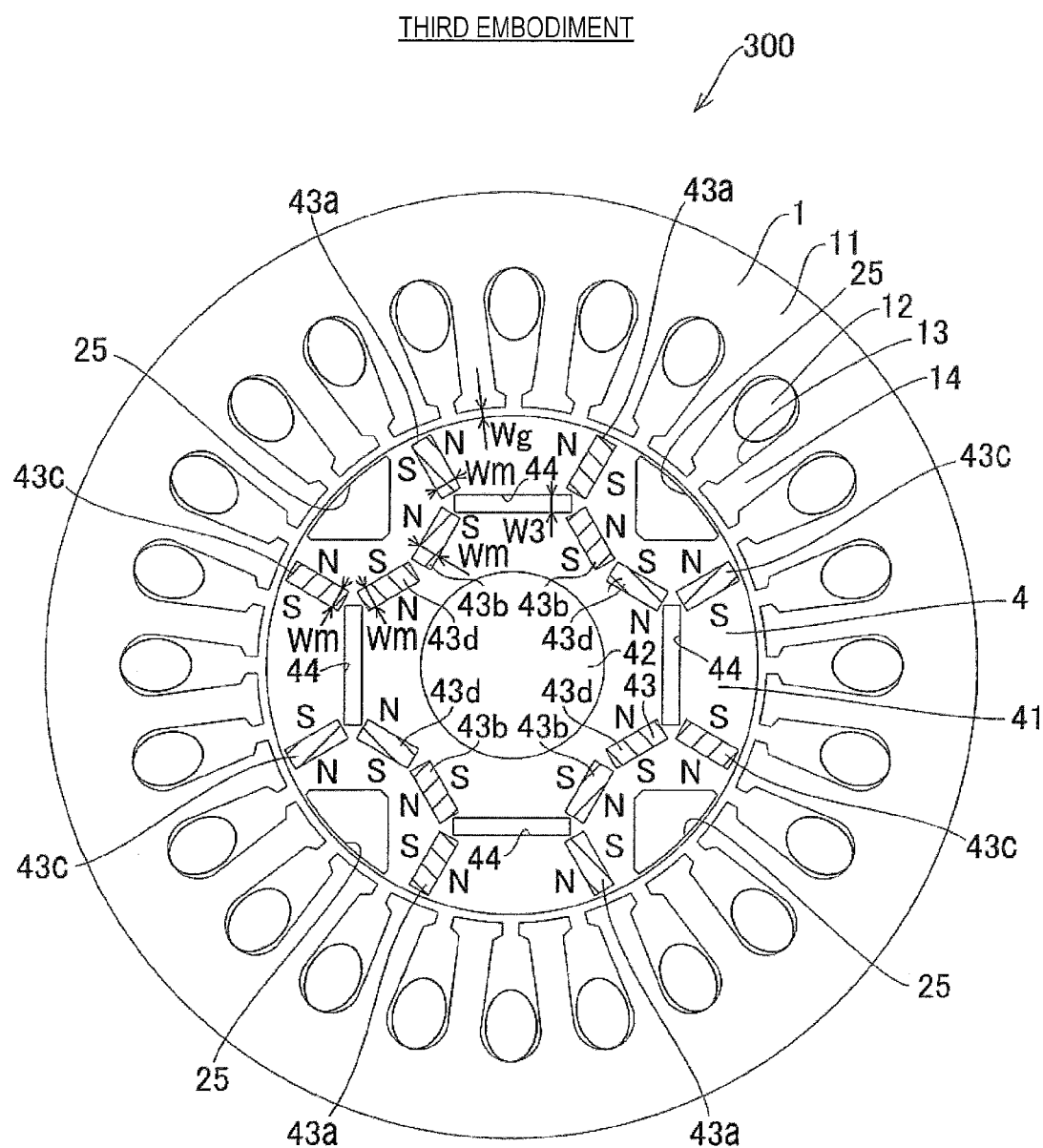
FIG. 8 is a plan view of a rotary electric machine according to a third embodiment.
Figure 9:
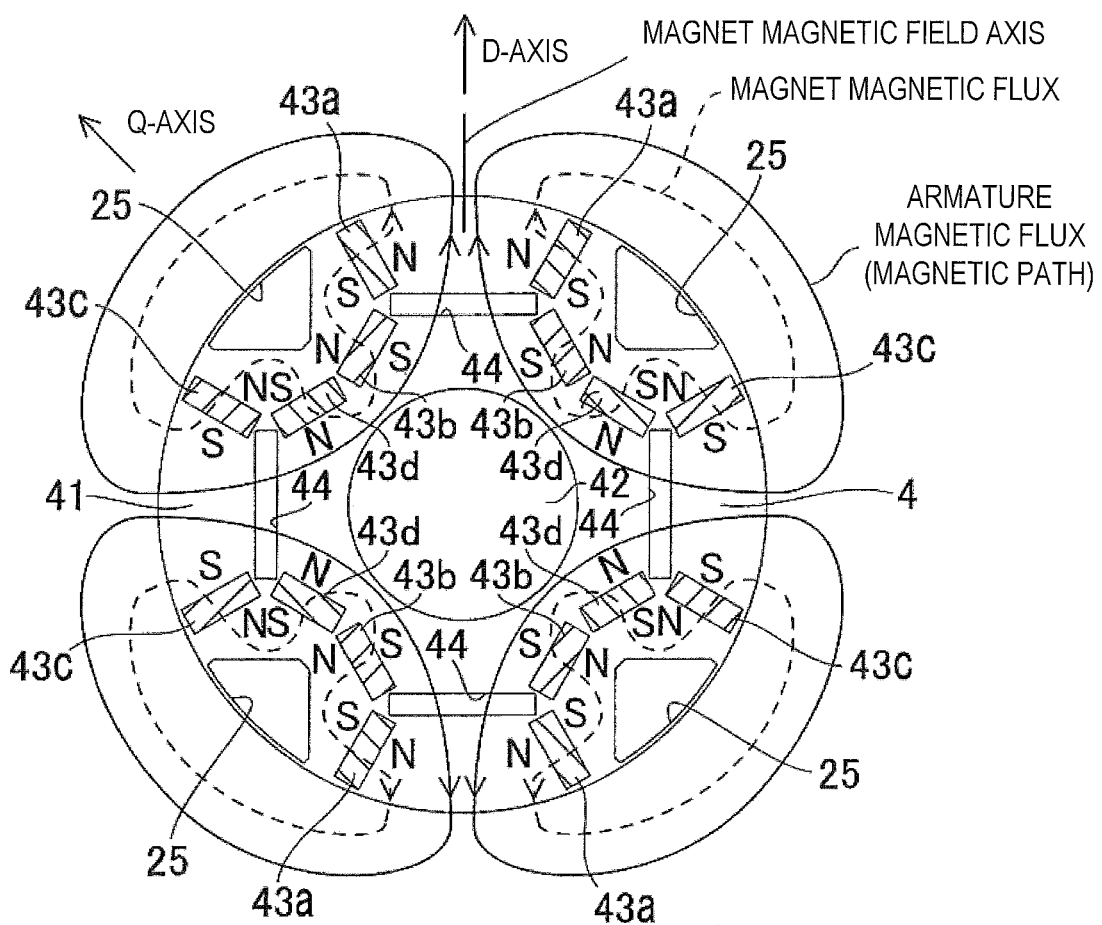
FIG. 9 is a plan view illustrating a magnetic flux which passes through a rotor of the rotary electric machine according to the third embodiment.

Next, with reference to FIGS. 8 and 9, a configuration of a rotary electric machine 300 according to a third embodiment is described. In the third embodiment, an example in which permanent magnets which are located adjacent to each other in the d-axis direction are arranged in a zigzag manner is described, unlike the above second embodiment in which the permanent magnets which are located adjacent to each other in the d-axis direction are aligned linearly.

As illustrated in FIG. 8, a rotor 4 according to the third embodiment includes a rotor core 41, a shaft 42, and permanent magnets 43a, 43b, 43c and 43d. The rotor core 41 includes slits 44 and flux barriers 25. The rotor core 41 is arranged so as to oppose to the inside of the stator core 11. The rotor core 41 is formed, for example, by laminating electromagnetic steel sheets. Note that the rotor core 41 may be, for example, formed by circularly bending a ferromagnetic member made of iron, or constructed from a ferromagnetic member of a circular cylindrical shape. Further, the ferromagnetic member of the circular cylindrical shape may be formed, for example, by casting. Note that the permanent magnets 43a and 43c are examples of the "first permanent magnets" in the claims, and the permanent magnets 43b and 43d are examples of the "second permanent magnets" in the claims. Further, the slit 44 is one example of the "gap" in the claims.

The shaft 42 is formed so as to penetrate the rotor core 41 at the center. This shaft 42 is constructed so as to rotatably support the rotor core 41. Further, the shaft 42 is made of magnetic material (e.g., magnetic stainless steel), similar to the above second embodiment.

The permanent magnets 43a-43d are embedded in the rotor core 41. In this embodiment, two pairs of permanent magnets 43a (or permanent magnets 43b-43d, respectively) are provided (total of four magnets), and each pair is oppositely arranged to each other. As illustrated in FIG. 9, each pair of permanent magnets 43a are arranged so that the N-poles thereof oppose to each other on both sides of the magnetic path of the d-axis and are separated from each other by a predetermined distance. Each pair of permanent magnets 43b are arranged so that the S-poles thereof oppose to each other on both sides of the magnetic path of the d-axis and are separated from each other by the predetermined distance. That is, the permanent magnets 43a are arranged so that the N-poles are oriented toward the magnetic path of the d-axis, and the permanent magnets 43b are arranged so that the S-poles are oriented toward the magnetic path of the d-axis. Further, each permanent magnet 43b is arranged so as to be adjacent in the d-axis direction in the zigzag manner to the corresponding permanent magnet 43a. That is, each pair of permanent magnets 43a are arranged on both sides of the magnetic path of the d-axis so that they are spread outwardly in the radial direction, and each pair of permanent magnets 43b are arranged on both sides of the magnetic path of the d-axis so that they are narrowed outwardly in the radial direction.

Each pair of permanent magnets 43c are arranged so that the S-poles thereof oppose to each other on both sides of the magnetic path of the d-axis and are separated from each other by the predetermined distance. Each pair of permanent magnets 43d are arranged so that the N-poles thereof oppose to each other on both sides of the magnetic path of the d-axis and are separated from each other by the predetermined distance. That is, the permanent magnets 43c are arranged so that the S-poles are oriented toward the magnetic path of the d-axis, and the permanent magnets 43d are arranged so that the N-poles are oriented toward the magnetic path of the d-axis. Each pair of permanent magnets 43d are arranged so as to be adjacent in the d-axis direction in the zigzag manner to the corresponding pair of permanent magnets 43c. That is, each pair of permanent magnets 43c are arranged on both sides of the magnetic path of the d-axis so that they are spread outwardly in the radial direction, and each pair of permanent magnets 43d are arranged on both sides of the magnetic path of the d-axis so that they are narrowed outwardly in the radial direction. Further, as illustrated in FIG. 9, the permanent magnets 43b and 43d are arranged so as to be adjacent to each other on both sides of the q-axis.

Further, the permanent magnets 43a-43d are arranged so that the d-axis of the armature (d-axis as the reluctance motor) and the magnet magnetic field axis are mutually oriented in the same direction. Further, each opposing pair of permanent magnets 43a (43b-43d) are arranged so as to have a predetermined angle with respect to the d-axis. The adjacent permanent magnets 43a-43d are arranged so as to surround the flux barrier 25 and to have their magnetic poles alternated. Particularly, the permanent magnet 43a is arranged so that the S-pole thereof faces toward the flux barrier 25. The permanent magnet 43b is arranged so that the N-pole thereof faces toward the flux barrier 25. The permanent magnet 43c is arranged so that the N-pole thereof faces toward the flux barrier 25. The permanent magnet 43d is arranged so that the S-pole thereof faces toward the flux barrier 25. The adjacent permanent magnets 43a-43d which surround the flux barrier 25 are arranged in a substantially U-shape. The permanent magnets 43a-43d are formed to have a width Wm (see FIG. 8), respectively. Further, the permanent magnets 43a-43d are comprised of, for example, permanent magnets made of ferrite.

In the third embodiment, each slit 44 is constructed to prevent or reduce that the magnet magnetic flux of the permanent magnets 43a and 43b (43c and 43d) which are located adjacent to the slit 44 magnetically short-circuits. Particularly, each slit 44 is constructed by a slit-shaped space (gap) extending in a direction intersecting with the direction of the magnet magnetic flux which short-circuits the permanent magnets 43a and 43b (43c and 43d) located adjacent to the slit 44. The slit 44 is formed within the magnetic path of the d-axis. That is, as illustrated in FIG. 9, the slits 44 are formed so as to extend in directions substantially perpendicular to the directions of armature magnetic flux (d-axis). Each slit 44 is formed within the magnetic path of the d-axis near a boundary between the N-pole of the permanent magnet 43a (S-pole of the permanent magnet 43c) and the S-pole of the permanent magnet 43b (N-pole of the permanent magnet 43d) which are located adjacent to the slit 44.

Further, each slit 44 is disposed at a position to prevent or reduce the short-circuit of the N-pole of the permanent magnet 43a (S-pole of the permanent magnet 43c) and the S-pole of the permanent magnet 43b (N-pole of the permanent magnet 43d) which are located adjacent to each other in the d-axis direction. Particularly, one pair of slits 44 are formed so as to linearly extend from near the boundary between the N-pole of one of the permanent magnets 43a and the S-pole of one of the permanent magnets 43b to near the boundary between the N-pole of the other permanent magnet 43a and the S-pole of the other permanent magnet 43b, which are arranged so as to oppose to each other on both sides of the magnetic path of the d-axis. Further, the other pair of slits 44 are formed so as to linearly extend from near the boundary between the S-pole of one of the permanent magnets 43c and the N-pole of one of the permanent magnets 43d to near the boundary between the S-pole of the other permanent magnet 43c and the N-pole of the other permanent magnets 43d, which are arranged so as to oppose to each other on both sides of the magnetic path of the d-axis. Further, the slits 44 are formed so as to extend in the directions substantially perpendicular to the radial directions of the rotor core 41.

As illustrated in FIG. 8, each slit 44 is formed to have a width W3 larger than the gap Wg between the rotor core 41 and the stator core 11. Particularly, the slit 44 is formed to have the width W3 which is twice larger than the gap Wg between the rotor core 41 and the stator core 11. Further, the slit 44 is formed to have the width W3 smaller than the width Wm of the permanent magnets 43a-43d. Thus, one pair of slits 44 are constructed so as to prevent the short-circuiting of the magnet magnetic flux through the permanent magnets 43a-43d. Further, the other pair of slits 44 are constructed so as to prevent the passing of the armature magnetic flux through the permanent magnets 43a-43d.

Other configurations of the third embodiment are similar to those of the above first embodiment.

Modifications

Note that the embodiments disclosed herein are instantiations in all aspects and should not be considered to be restrictive. The scope of the present disclosure is not defined by the description of the embodiments but defined by the appended claims, and encompasses all changes in meanings equivalent to the scope of the claims and all changes within the scope of the claims.

For example, the slits (gaps) are formed so as to extend in the radial directions of the stator core in the above first embodiment, and the slits (gaps) are formed so as to extend in the directions which intersect perpendicular to the radial directions of the stator core in the second and third embodiments. However, the gaps may be formed in other patterns (e.g., a pattern in which the gaps extend in directions which intersect at angles other than right angle with respect to the radial directions of the rotor core), as long as the gaps are formed within the magnetic path of the d-axis. Further, the gaps may be formed in a circular shape or a polygonal shape other than the slit shape, as long as the gap is formed within the magnetic path of the d-axis.

Figure 10:
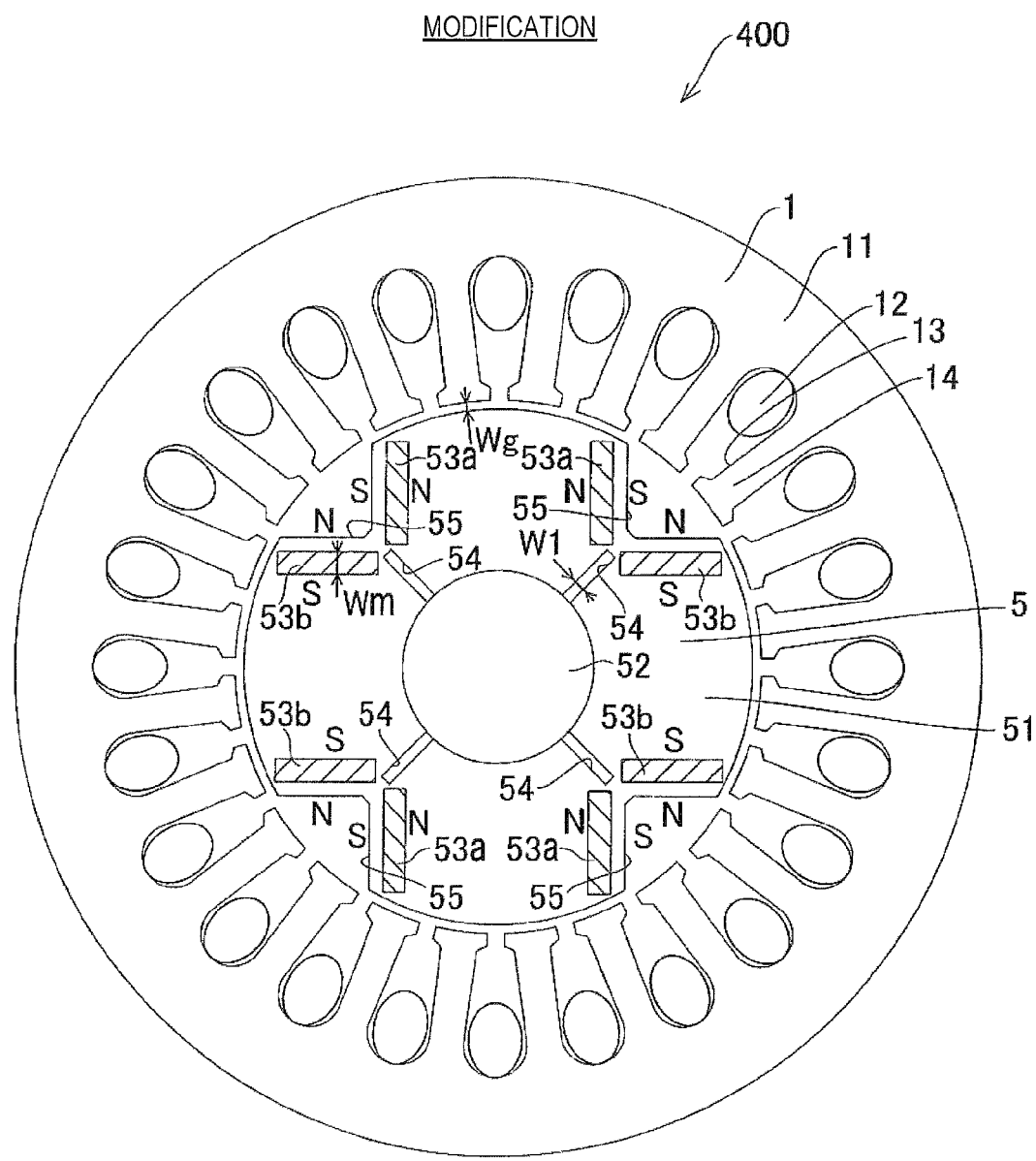
FIG. 10 is a plan view of a rotary electric machine according to a modification of the first embodiment.

In the above first embodiment, the slits (gaps) are formed so as to extend to near the shaft. However, gaps 54 may be formed, like a rotary electric machine 400 according to a modification of the first embodiment illustrated in FIG. 10, so as to extend until they connect with the shaft 52. In such a case, a rotor 5 includes a rotor core 51, a shaft 52, and permanent magnets 53a and 53b. Each gap 54 is formed in the rotor core 51 in a slit shape. Since the gap 54 is formed so as to extend until it connects with the shaft 52, it is possible to prevent or reduce more easily that the magnet magnetic flux of the permanent magnets 53a and 53b short-circuits. Moreover, each flux barrier 55 is formed near the outer circumferential part of the rotor core 51 in a notch shape on the side where the permanent magnets 53a and 53b are disposed. Like this modification of the first embodiment, the rotor core 51 may be formed so as to lack the parts of the rotor core which are radially outward of the flux barriers 55.

As described above, in one embodiment, a rotary electric machine includes a rotor core, a plurality of permanent magnets embedded in the rotor core, and a stator core arranged so as to oppose to the rotor core. The plurality of permanent magnets include a pair of first permanent magnets. The pair of first permanent magnets are arranged so that first magnetic poles thereof having the same polarity oppose to each other and are separated from each other on both sides of a magnetic path of d-axis by a predetermined distance. The rotor core includes gaps formed within the magnetic path of the d-axis.

In this rotary electric machine, since the magnet magnetic field axis and the d-axis are oriented mutually in the same direction by providing the pair of first permanent magnets arranged so that the first same magnetic poles thereof having the same polarity oppose to each other and are separated from each other on both sides of the magnetic path of the d-axis by the predetermined distance. Thus, the torque by the magnet magnetic flux and the reluctance torque by the armature magnetic flux can be generated, without mutually canceling the torques. Therefore, the torque of the rotary electric machine can further be increased. In addition, the gaps are formed in the rotor core, within the magnetic path of the d-axis to prevent or reduce that the magnet magnetic flux short-circuits via the magnetic path of the d-axis. Thus, the torque by the magnet magnetic flux can efficiently be generated.

In one embodiment, a rotor includes a rotor core, and a plurality of permanent magnets embedded in the rotor core. The plurality of permanent magnets are arranged so that magnet magnetic field axis and d-axis are oriented mutually in the same direction. The rotor core includes gaps formed within a magnetic path of the d-axis.

In this rotor, the plurality of permanent magnets are arranged so that the magnet magnetic field axis and the d-axis are oriented mutually in the same direction. Thus, the torque by the magnet magnetic flux and the reluctance torque by the armature magnetic flux can be generated, without mutually canceling the torques. Therefore, the rotor which can further increase the torque of the rotary electric machine can be provided. In addition, the gaps are formed in the rotor core, within the magnetic path of the d-axis to prevent or reduce that the magnet magnetic flux short-circuits via the magnetic path of the d-axis. Thus, the torque by the magnet magnetic flux can efficiently be generated.

According to the rotary electric machine and the rotor described above, the torque of the rotary electric machine can further be increased.

What is claimed is:

1. A rotary electric machine, comprising:
a rotor core;
a plurality of permanent magnets embedded in the rotor core; and
a stator core arranged so as to oppose the rotor core,
wherein the plurality of permanent magnets include a pair of first permanent magnets, the pair of first permanent magnets being arranged so that first magnetic poles thereof having the same polarity oppose each other and are separated from each other on both sides of a magnetic path of d-axis by a predetermined distance, north poles of the first magnetic poles being disposed closer to the magnetic path of the d-axis than south poles of the pair of first permanent magnets, and
wherein the rotor core includes gaps formed within the magnetic path of the d-axis, the gaps being disposed at positions to prevent the north poles of the first magnetic poles short-circuiting through a central portion of the rotor core.

2. The rotary electric machine of claim 1, wherein the plurality of permanent magnets further include second permanent magnets, each of the second permanent magnets being arranged adjacent to the first permanent magnet and a second magnetic pole thereof having different polarity from the first magnetic pole is oriented toward the magnetic path of the d-axis, and
wherein each of the gaps is formed within the magnetic path of the d-axis near a boundary between the first magnetic pole of the first permanent magnet and the second magnetic pole of the second permanent magnet that are adjacent to the gap.

3. The rotary electric machine of claim 2, wherein the gap is formed so as to extend in a direction intersecting with the d-axis, within the magnetic path of the d-axis near the boundary between the first magnetic pole of the first permanent magnet and the second magnetic pole of the second permanent magnet that are adjacent to the gap.

4. The rotary electric machine of claim 3, wherein the gap is formed in a slit shape extending in the direction intersecting with the d-axis.

5. The rotary electric machine of claim 4, wherein the gap has a width larger than a gap between the rotor core and the stator core.

6. The rotary electric machine of claim 5, wherein the gap has a width twice larger than the gap between the rotor core and the stator core.

7. The rotary electric machine of claim 4, wherein the gap has a width smaller than a width of the permanent magnet.

8. The rotary electric machine of claim 2, wherein the first permanent magnet and the second permanent magnet are arranged so as to extend along the d-axis, and
wherein the gap is formed so as to extend in a direction intersecting with extending directions of the first permanent magnet and the second permanent magnet, within the magnetic path of the d-axis near the boundary between the first magnetic pole of the first permanent magnet and the second magnetic pole of the second permanent magnet that are adjacent to the gap.

9. The rotary electric machine of claim 2, wherein the pair of first permanent magnets are arranged in parallel so as to oppose each other and extend along the d-axis,
wherein each of the second permanent magnets includes a pair of second permanent magnets, each of the second permanent magnets is arranged so as to extend in a direction substantially perpendicular to the corresponding first permanent magnet, and
wherein each of the gaps is formed so as to linearly extend inwardly in a radial direction of the rotor core from near the boundary between the first permanent magnet and the second permanent magnet.

10. The rotary electric machine of claim 9, further comprising a shaft made of nonmagnetic material, for rotatably supporting the rotor core,
wherein each of the gaps is formed so as to linearly extend from near the boundary between the first permanent magnet and the second permanent magnet to near the shaft inwardly in the radial direction of the rotor core.

11. The rotary electric machine of claim 2, wherein the second permanent magnet includes a pair of second permanent magnets, the pair of second permanent magnets being arranged so as to be adjacent to the pair of first permanent magnets in a d-axis direction, respectively, and being arranged so that the second magnetic poles thereof having the same polarity oppose each other and are separated from each other on both sides of the magnetic path of the d-axis by a predetermined distance, and
wherein the gap is formed so as to linearly extend from near a boundary between the first magnetic pole of one of the first permanent magnets and the second magnetic pole of one of the second permanent magnets to near a boundary between the first magnetic pole of the other first permanent magnet and the second magnetic pole of the other second permanent magnet, one of the first permanent magnets being arranged so as to oppose the other first permanent magnet on both sides of the magnetic path of the d-axis and one of the second permanent magnets being arranged so as to oppose the other second permanent magnet on both sides of the magnetic path of the d-axis.

12. The rotary electric machine of claim 11, wherein the gap is formed so as to extend in a direction substantially perpendicular to the d-axis.

13. The rotary electric machine of claim 11, wherein the gap is formed in a slit shape extending in the direction substantially perpendicular to a radial direction of the rotor core.

14. The rotary electric machine of claim 1, wherein the permanent magnet is comprised of a permanent magnet made of ferrite.

15. The rotary electric machine of claim 1, wherein the rotor core further includes flux barriers, each flux barrier being formed near an outer circumferential part of the rotor core and on the opposite side of the permanent magnets from the gap, and wherein the plurality of permanent magnets are arranged so as to surround the flux barrier.

16. The rotor of claim 1, further comprising flux barriers formed substantially in a fan shape or in a notch shape such that a magnetic flux of the permanent magnets forms a closed loop surrounding each flux barrier.

17. The rotor of claim 1, wherein each of the gaps includes a width and a length such that the length of each of the gaps is larger than the width of the gap, the length of the gap extending in a direction substantially perpendicular to the magnetic path of the d-axis.

18. The rotor of claim 1, wherein the plurality of permanent magnets are arranged so that the magnet magnetic field axis and the d-axis are oriented mutually in the same direction, and wherein the gaps are intersected by the magnetic path of the d-axis.

19. A rotor, comprising:
a rotor core;
a flux barrier formed substantially in a fan shape or in a notch shape near an outer circumferential part of the rotor core; and
a plurality of permanent magnets embedded in the rotor core,
wherein the plurality of permanent magnets include first and second permanent magnets, the first and second permanent magnets being arranged so that first magnetic poles thereof having a different polarity face the flux barrier, the first and second permanent magnets being disposed on opposite sides of the flux barrier in a circumferential direction of the rotor core,
wherein the plurality of permanent magnets are arranged so that magnet magnetic field axis and d-axis are oriented mutually in the same direction, and
wherein the rotor core includes gaps that are intersected by a magnetic path of the d-axis, the gaps being disposed at positions to prevent the north pole of one of the first and second permanent magnets short-circuiting through a central portion of the rotor core.

20. The rotor of claim 19, wherein the plurality of permanent magnets include a pair of first permanent magnets, the pair of first permanent magnets being arranged so that first magnetic poles thereof having the same polarity oppose each other and are separated from each other on both sides of the magnetic path of the d-axis by a predetermined distance, and second permanent magnets, each of the second permanent magnets being arranged adjacent to the first permanent magnet and a second magnetic pole thereof having different polarity from the first magnetic pole is oriented toward the magnetic path of the d-axis, and wherein each of the gaps is formed within the magnetic path of the d-axis near a boundary between the first magnetic pole of the first permanent magnet and the second magnetic pole of the second permanent magnet, that are adjacent to the gap.

21. The rotor of claim 20, wherein the gap is formed so as to extend in a direction intersecting with the d-axis, within the magnetic path of the d-axis near the boundary between the first magnetic pole of the first permanent magnet and the second magnetic pole of the second permanent magnet that are adjacent to the gap.

22. The rotor of claim 21, wherein the gap is formed in a slit shape extending in the direction intersecting with the d-axis, and the gap is formed to have a width larger than a gap between a stator core arranged so as to oppose the outer circumferential part of the rotor core, and the rotor core.

23. The rotor of claim 21, wherein the gap is formed in a slit shape extending in the direction intersecting with the d-axis, and the gap is formed to have a width smaller than a width of the permanent magnet.

24. The rotor of claim 19, further comprising a plurality of flux barriers formed substantially in a fan shape or in a notch shape such that a magnetic flux of the permanent magnets forms a closed loop surrounding each flux barrier.

25. The rotor of claim 19, wherein each of the gaps includes a width and a length such that the length of each of the gaps is larger than the width of the gap, the length of the gap extending in a direction substantially perpendicular to the magnetic path of the d-axis.

* * * * *